United States Patent
Chang et al.

(10) Patent No.: US 12,014,009 B2
(45) Date of Patent: Jun. 18, 2024

(54) METHOD AND SYSTEM FOR OBTAINING HANDWRITING TRAJECTORY

(71) Applicant: Quanta Computer Inc., Taoyuan (TW)

(72) Inventors: Chia-Yuan Chang, Taoyuan (TW);
Jung-Wen Chang, Taoyuan (TW);
Chin-Kang Chang, Taoyuan (TW);
Ming-Yu Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 63 days.

(21) Appl. No.: 17/819,992

(22) Filed: Aug. 16, 2022

(65) Prior Publication Data

US 2023/0236700 A1     Jul. 27, 2023

(30) Foreign Application Priority Data

Jan. 21, 2022    (TW) .................................. 111102508

(51) Int. Cl.
| | |
|---|---|
| G06F 3/041 | (2006.01) |
| G06F 3/042 | (2006.01) |
| G06T 7/136 | (2017.01) |
| G06T 7/73 | (2017.01) |
| H04N 23/74 | (2023.01) |

(52) U.S. Cl.
CPC ............ *G06F 3/0425* (2013.01); *G06T 7/136* (2017.01); *G06T 7/73* (2017.01); *H04N 23/74* (2023.01); *G06T 2207/10152* (2013.01); *G06T 2207/30241* (2013.01)

(58) Field of Classification Search
CPC ......... G06F 3/0425; G06T 2207/10152; G06T 2207/30241; G06T 7/136; G06T 7/73; H04N 23/74
See application file for complete search history.

(56) References Cited

U.S. PATENT DOCUMENTS

| | | | |
|---|---|---|---|
| 10,311,323 B2 | 6/2019 | Teshima et al. | |
| 2020/0229678 A1* | 7/2020 | Shin | ................... A61B 1/00006 |
| 2021/0224566 A1* | 7/2021 | Bellert | ................. G06V 30/413 |

FOREIGN PATENT DOCUMENTS

CN             103198498 B       1/2016

OTHER PUBLICATIONS

Chinese language office action dated Nov. 3, 2022, issued in application No. TW 111102508.

\* cited by examiner

*Primary Examiner* — Insa Sadio
(74) *Attorney, Agent, or Firm* — McClure, Qualey & Rodack, LLP

(57) ABSTRACT

A method for obtaining a handwriting trajectory is provided. The method includes the following steps: capturing images of handwriting that is written with a writing brush on a piece of paper on a writing platform; obtaining positions where pixels in each of the images are lower than a threshold according to the threshold; and outputting handwriting images according to the positions.

8 Claims, 9 Drawing Sheets

METHOD AND SYSTEM FOR OBTAINING HANDWRITING TRAJECTORY

CROSS REFERENCE TO RELATED APPLICATIONS

This application claims priority from Taiwan Patent Application No. 111102508, filed on Jan. 21, 2022, the disclosure of which is incorporated herein in its entirety by reference.

BACKGROUND OF THE APPLICATION

Field of the Application

The present disclosure generally relates to a method and a system for obtaining a handwriting trajectory. More specifically, aspects of the present disclosure relate to a method and a system for obtaining a handwriting trajectory using architecture composed of ambient light and a reflective light source.

Description of the Related Art

Handwriting trajectory digitization technology has promising applications in the education industry. With this method of applying information technology to education, learners can record their handwriting trajectory without changing their existing handwriting habits, so as to achieve a better diagnosis of their learning.

However, how to further obtain clear trajectory information of fonts, so that learners can imitate and learn through handwriting trajectory information, is still the goal to be achieved at present.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and system for obtaining a handwriting trajectory to achieve the goal.

In an exemplary embodiment, a method for obtaining a handwriting trajectory is provided. The method comprises capturing images of handwriting that is written with a writing brush on a piece of paper on a writing platform; obtaining positions where pixels in each of the images are lower than a threshold according to the threshold; and outputting handwriting images according to the positions.

In some embodiments, the writing platform comprises a box, at least one light source, and a camera. An upper plane of the box is glass on which the paper is placed. The light source is disposed inside the box to illuminate the glass. The camera is disposed inside the box and below the glass, and capturing the images.

In some embodiments, before capturing the images, the method further comprises obtaining an initial background image when the at least one light source is turned on; and defining the threshold according to a grayscale value of the initial background image.

In some embodiments, the camera captures the images periodically, and the at least one light source illuminates the glass in a flickering manner.

In some embodiments, the at least one light source is a visible light-emitting diode (LED).

In some embodiments, seventy-five percent (75%) of the grayscale value corresponding to the initial background image is defined as the threshold.

In an exemplary embodiment, a method for obtaining a handwriting trajectory is provided. The method comprises the following steps: capturing images of handwriting that is written with a writing brush on a piece of paper on a writing platform; performing an inversion process on the images; and outputting handwriting images.

In an exemplary embodiment, a system for obtaining a handwriting trajectory is provided. The system comprises a computing device and a writing platform, wherein the writing platform is coupled to the computing device. The writing platform comprises a box, at least one light source and a camera. An upper plane of the box is a glass on which a piece of paper is placed. The at least one light source is disposed inside the box to illuminate the glass. The camera is disposed inside the box and below the glass. The computing device and the writing platform execute the following operations comprising: capturing images of handwriting that is written with a writing brush on the paper by the camera; obtaining positions where pixels in each of the images are lower than a threshold according to the threshold; and outputting handwriting images according to the positions.

In an exemplary embodiment, a system for obtaining a handwriting trajectory is provided. The system comprises a computing device and a writing platform, wherein the writing platform is coupled to the computing device. The writing platform comprises a box, a camera and at least one infrared light-emitting diode (LED). An upper plane of the box is a black infrared (IR) glass on which a piece of paper is placed. The camera is disposed inside the box and below the black infrared glass. The at least one infrared light-emitting diode (LED) is arranged around the camera to illuminate the glass. The computing device and the writing platform execute the following operations comprising: capturing images of handwriting that is written with a writing brush on the paper; performing an inversion process on the images; and outputting handwriting images.

BRIEF DESCRIPTION OF DRAWINGS

The application can be more fully understood by reading the subsequent detailed description and examples with references made to the accompanying drawings, wherein.

DETAILED DESCRIPTION

Various aspects of the disclosure are described more fully below with reference to the accompanying drawings. This disclosure may, however, be embodied in many different forms and should not be construed as being limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
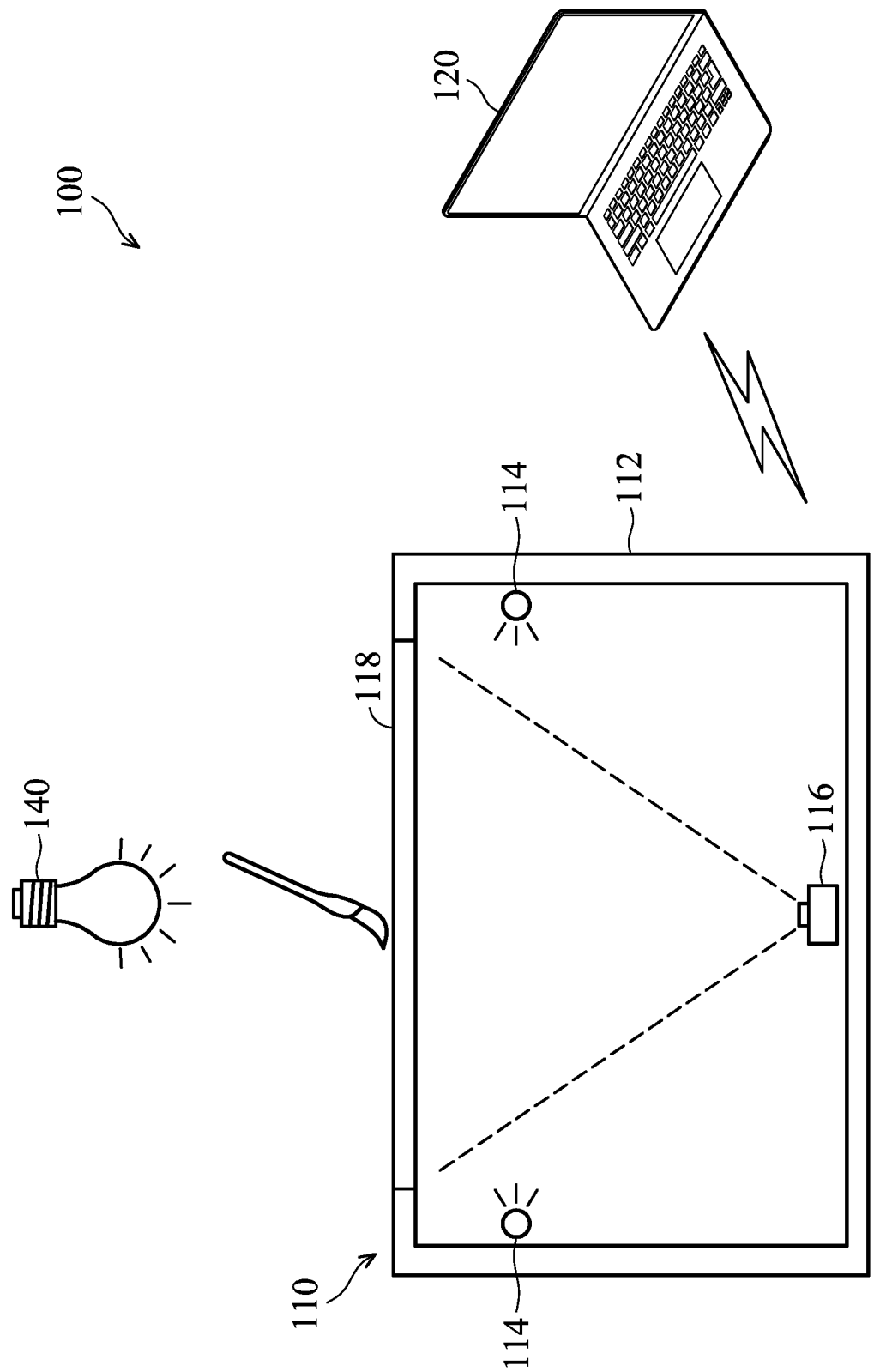
FIG. 1 is a schematic diagram of a system for obtaining a handwriting trajectory according to an embodiment of the present disclosure.

FIG. 1 is a schematic diagram of a system 100 for obtaining a handwriting trajectory according to an embodiment of the present disclosure. The system 100 comprises a writing platform 110 and a computing device 120, wherein the writing platform 110 is coupled to the computing device 120.

The writing platform 110 comprises a box 112, at least one light source 114 and a camera 116. The ambient light 140 is located above the writing platform 110. The upper plane of the box 112 is a glass 118 on which a piece of paper is placed. The light source 114 is disposed inside the box 112 to illuminate the glass 118, wherein the light source 114 is a visible light-emitting diode (LED). The camera 116 is disposed inside the box 112 and below the glass 118 to capture images of handwriting that is written with a writing brush 130 writing on a piece of paper on the glass 118.

It should be noted that although the light sources 114 are arranged on both sides of the box 112 in FIG. 1, and the number of the light sources 114 used in this example is two, it should not be limited in the disclosure. That is, the light sources 114 may be disposed in other places inside the box 112, or the number of the light source may be one.

The computing device 120 may be connected to the camera 116 via a wired network or a wireless network and receive images captured by the camera 116. The computing device 120 comprises a processor and a memory that may store programs. The types of computing device 120 range from small handheld devices, such as mobile telephones and handheld computers, to large mainframe systems, such as mainframe computers. Examples of handheld computers include personal digital assistants (PDAs) and notebooks. In another embodiment, the computing device 120 may be used with components, systems, sub-systems, and/or devices other than those that are depicted herein. For example, the computing device 120 can be integrated with the camera 116 as a device.

It should be understood that the computing device 120 shown in FIG. 1 is an example of one suitable system 100 architecture for obtaining a handwriting trajectory. The computing device 120 shown in FIG. 1 may be implemented through any type of computing device, such as the computing device 900 described with reference to FIG. 9, for example.

Figure 2:
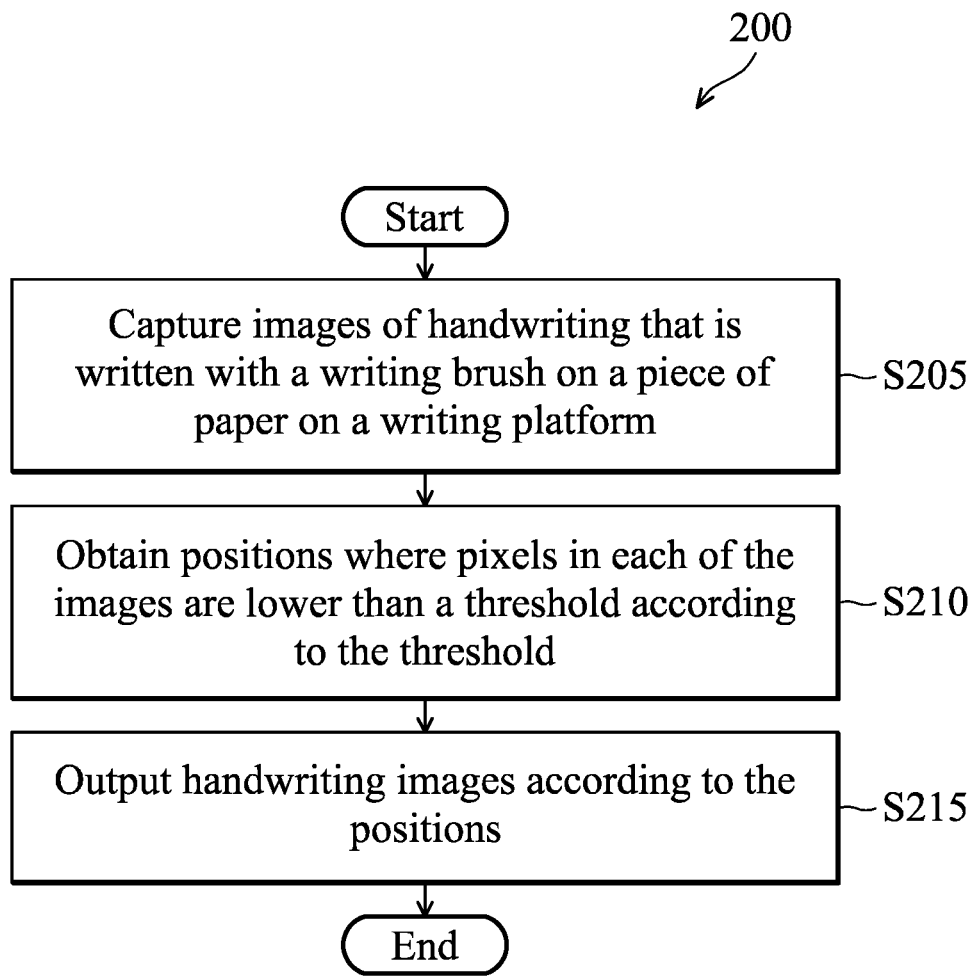
FIG. 2 is a flowchart illustrating a method for obtaining a handwriting trajectory according to an embodiment of the present disclosure.

FIG. 2 is a flowchart 200 illustrating a method for obtaining a handwriting trajectory according to an embodiment of the present disclosure. The method may be executed by the writing platform 110 and the computing device 120 of the system 100 as shown in FIG. 1.

In step S205, the camera of the writing platform captures images of handwriting that is written with a writing brush on a piece of paper on the writing platform. Next, in step S210, the computing device obtains positions where pixels in each of the images are lower than a threshold according to the threshold. In step S215, the computing device outputs handwriting trajectory images according to the positions. In another embodiment, the computing device may outputs a handwriting trajectory video composed of the handwriting trajectory images.

Figure 3:
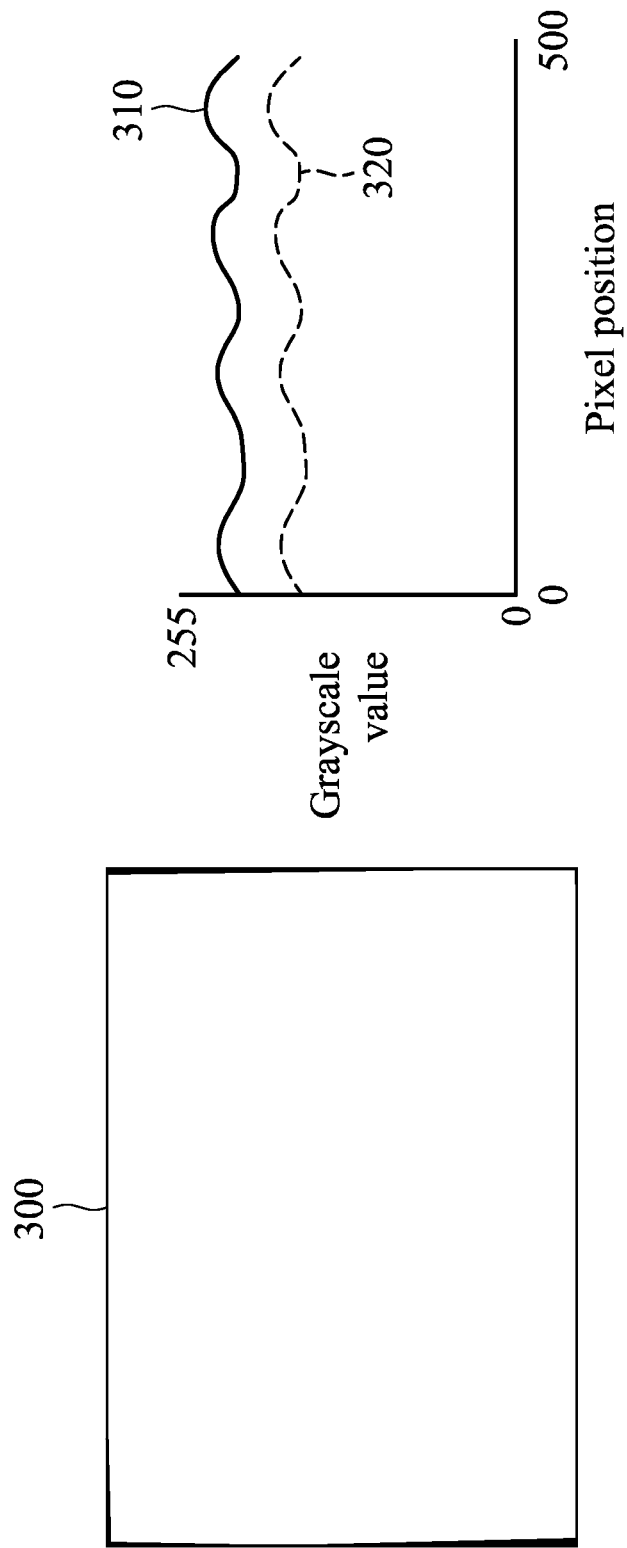
FIG. 3 is a schematic diagram showing an initial background image and grayscale values according to an embodiment of the present disclosure.
Figure 4:
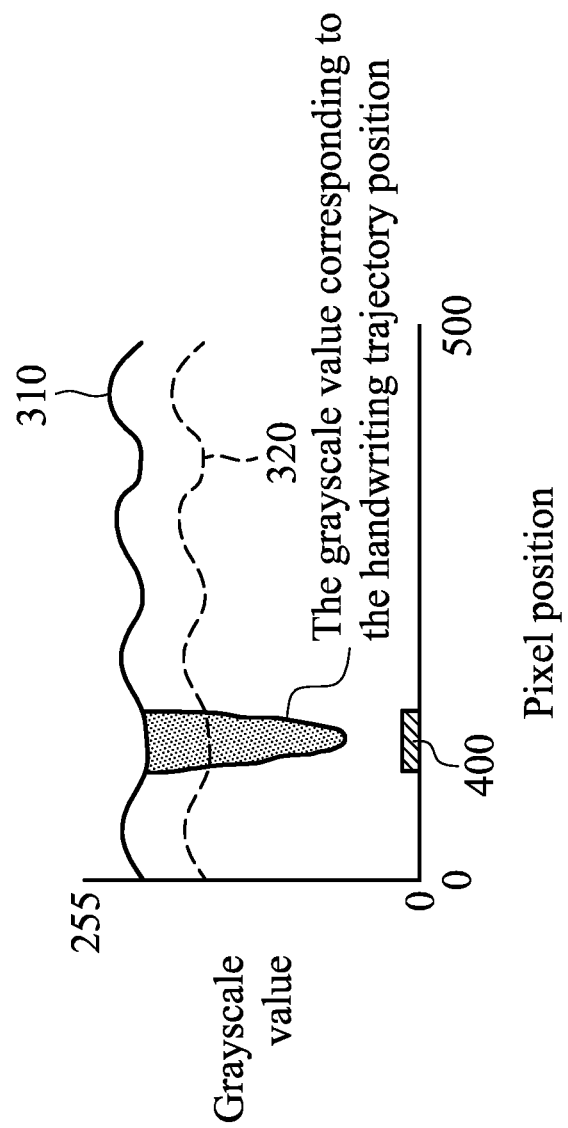
FIG. 4 is a schematic diagram of recording a handwriting trajectory position according to an embodiment of the present disclosure.

Specifically, before the process starts, the camera can obtain an initial background image when the light source of the writing platform is turned on. FIG. 3 is a schematic diagram showing an initial background image and grayscale values according to an embodiment of the present disclosure. As shown in FIG. 3, the left part of FIG. 3 is a paper image (i.e., the initial background image 300) captured when the light source of the writing platform is turned on; the right part of FIG. 3 is the grayscale values 310 corresponding to the initial background image 300. In this embodiment, seventy-five percent (75%) of the grayscale value corresponding to the initial background image is defined as the threshold 320 (indicated by the dotted line). In other words, as long as the positions are lower than 75% (the threshold 320) of the grayscale value corresponding to the initial background image, the computing device determines that the positions are the handwriting trajectory positions, records all positions lower than the threshold 320, and outputs handwriting trajectory images according to the positions. As shown in FIG. 4, during the user's writing process, when the grayscale value corresponding to the handwriting trajectory position 400 is lower than the threshold 320, the computing device records the pixel position of the position 400.

It should be noted that the threshold is not used to limit the present disclosure, and those skilled in the art can make appropriate replacements or adjustments according to this embodiment.

In the case of actual handwriting, when the light source of the writing platform is not turned on, the handwriting trajectory written with the writing brush is very obvious and retains the details, but the disadvantage is that the shadow of the arm may interfere with the handwriting trajectory. When the light source of the writing platform is turned on, the shadows of the arm and the writing brush may be filtered out. However, when the paper is a paper with poor penetration, the handwriting trajectory with the writing brush may not be obvious, and the details of the handwriting trajectory may disappear.

Therefore, in order to overcome the problems, in one embodiment, the camera uses periodically capture the images of the handwriting with the writing brush on a piece of paper on the writing platform, and the light source illuminates the glass in a flickering manner.

Figure 5:
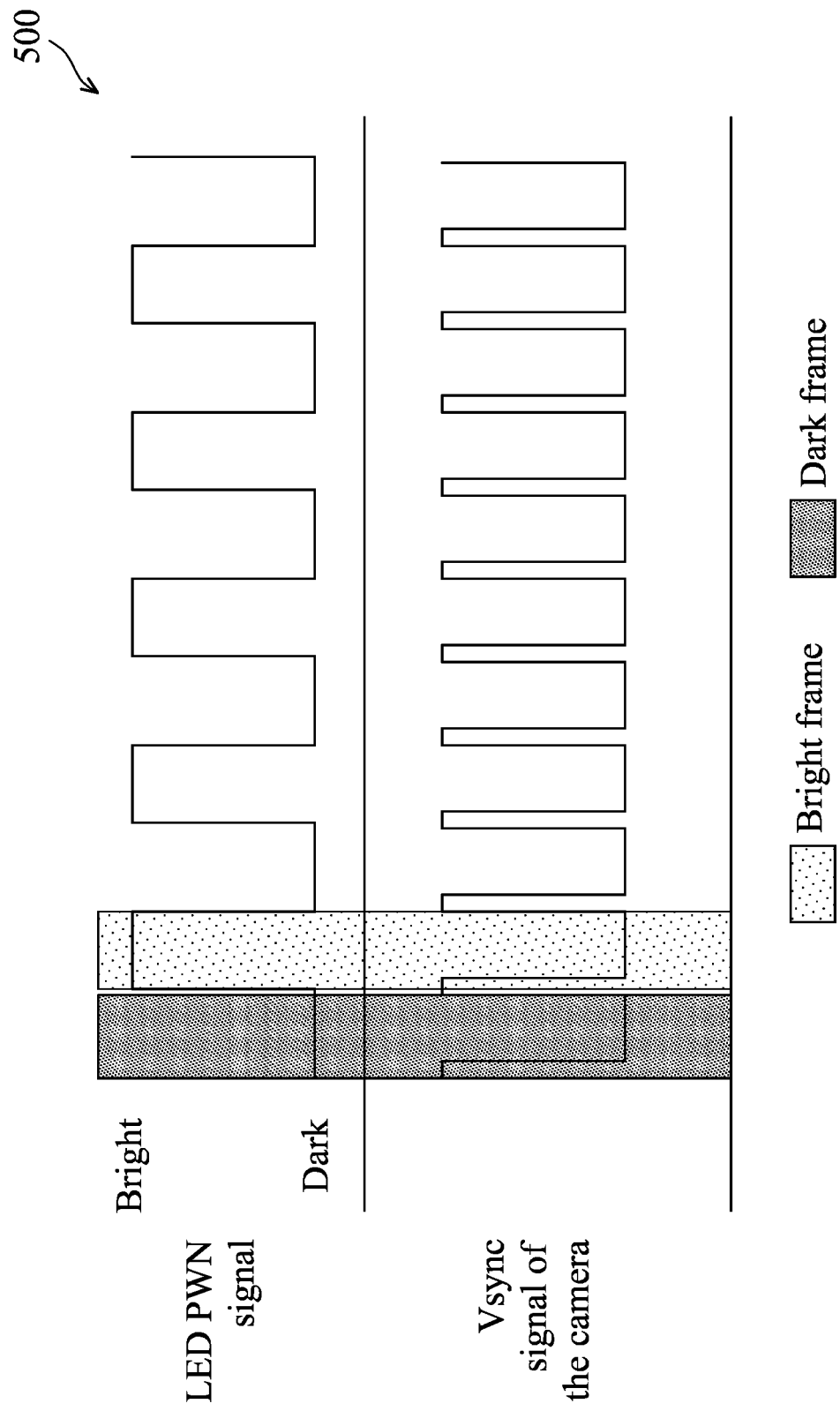
FIG. 5 is a schematic diagram showing how the camera captures the images periodically and the light source illuminates the glass in a flickering manner according to an embodiment of the present disclosure.

FIG. 5 is a schematic diagram 500 showing how the camera captures the images periodically and the light source illuminates the glass in a flickering manner according to an embodiment of the present disclosure. As shown in FIG. 5, the upper part of FIG. 5 is the pulse width modulation (PWN) signal of the LED light source. The bottom part of FIG. 5 is the vertical synchronization (vsync) signal (representing the signal output per frame) of the camera. In this embodiment, the camera may quickly capture the images when the LED light source is turned on and off, so that the handwriting trajectory may be captured regardless of the material and the transmittance of the paper without being disturbed by the shadow of the user's arm.

Figure 6:
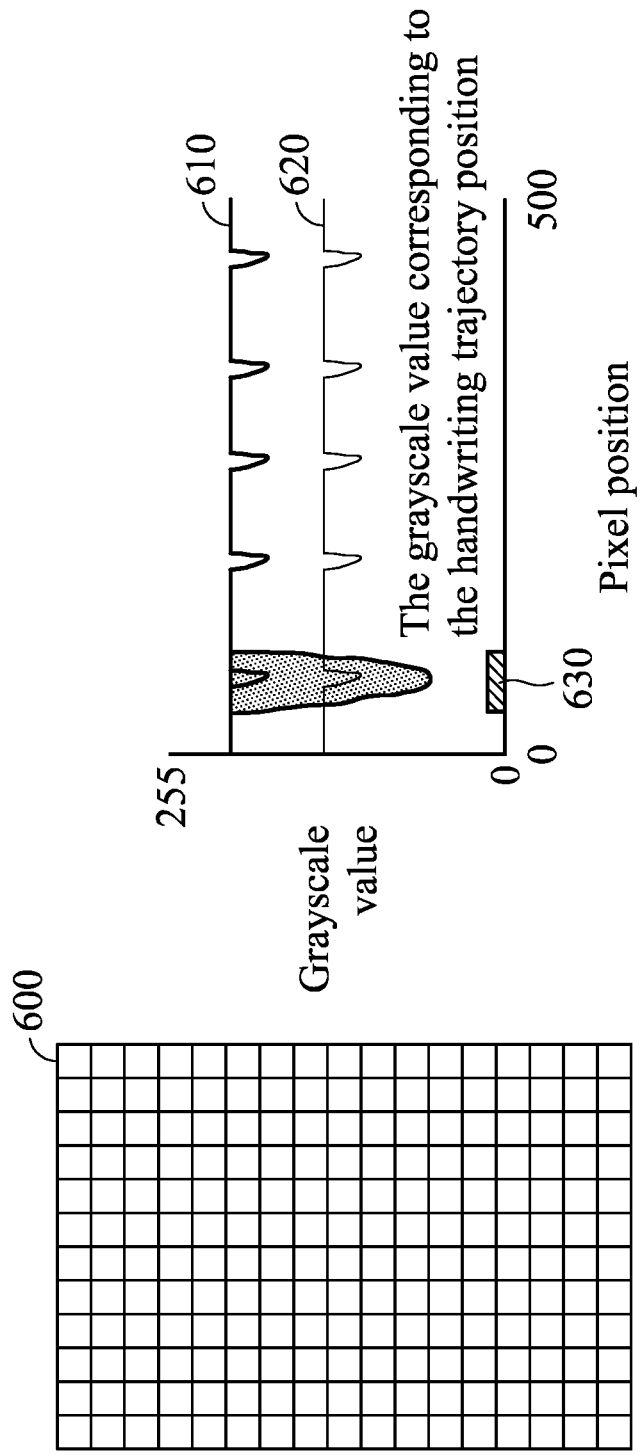
FIG. 6 is a schematic diagram showing that the initial background image is grid paper and grayscale values corresponding to the grid paper according to an embodiment of the present disclosure.

FIG. 6 is a schematic diagram showing that the initial background image is grid paper and grayscale values corresponding to the grid paper according to an embodiment of the present disclosure. As shown in FIG. 6, the left part of FIG. 6 is the paper image of the grid paper (i.e., the initial background image 600 of the grid paper) captured by the camera when the light source of the writing platform is turned on; the right part of FIG. 6 is the grayscale value 610 corresponding to the initial background image 600 of the grid paper. In this embodiment, seventy-five percent (75%) of the grayscale value corresponding to the initial background image 600 is defined as the threshold 620. In other words, as long as the positions are lower than 75% (the threshold 620) of the grayscale value corresponding to the initial background image 600 of the grid paper, the computing device determines that the positions are the handwriting trajectory positions, records all positions lower than the threshold 620, and outputs handwriting trajectory images according to the positions. As shown in FIG. 6, during the user's writing process, when the grayscale value corresponding to the handwriting trajectory position 630 is lower than the threshold 620, the computing device records the pixel position of the position 630.

It should be noted that the threshold is not used to limit the present disclosure, and those skilled in the art can make appropriate replacements or adjustments according to this embodiment.

In FIG. 1, the box 112 is made of the glass 118 which is transparent and the light sources 114 are visible light LEDs. However, the user may still see the objects in the box 112 when actually writing. For example, the user may look directly at the light sources 114 at a certain angle, causing discomfort to the eyes. Therefore, another new architecture is introduced below to improve the above problems.

Figure 7:
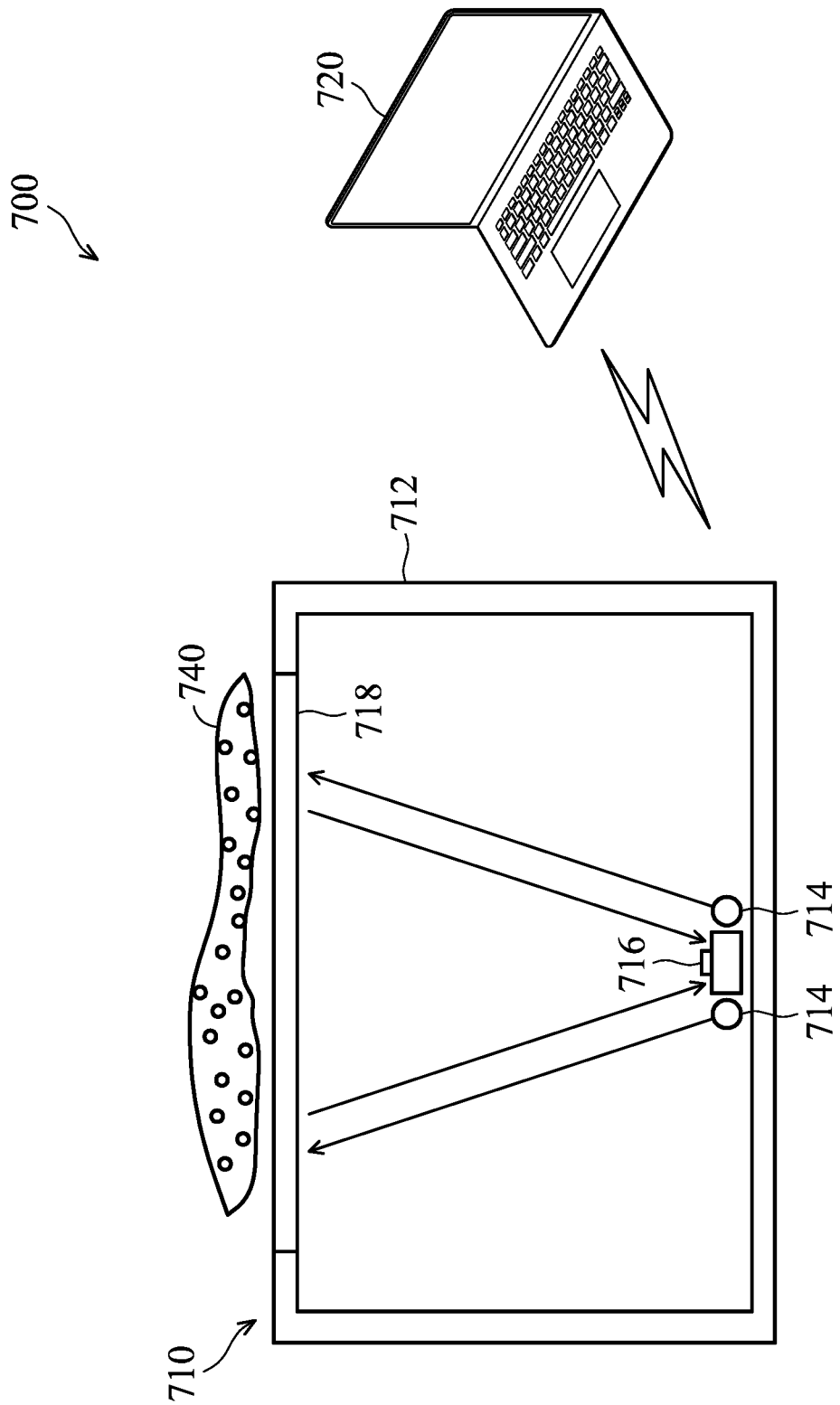
FIG. 7 is a schematic diagram of a system for obtaining a handwriting trajectory according to an embodiment of the present disclosure.

FIG. 7 is a schematic diagram of a system 700 for obtaining a handwriting trajectory according to an embodiment of the present disclosure. The system 700 comprises a writing platform 710 and a computing device 720.

The writing platform 710 comprises a box 712, at least one infrared light-emitting diode (LED) 714 and a camera 716. The upper plane of the box 712 is a black infrared (IR) glass 718 on which a piece of paper is placed. The camera 716 is disposed inside the box 712 and below the black infrared glass 718 to capture images of handwriting that is written with a writing brush writing on a piece of paper on the black infrared glass 718. The infrared light-emitting diodes 714 are disposed around the camera 716 and illuminate the black infrared glass 718.

It should be noted that although the number of infrared light-emitting diodes 714 in FIG. 7 used in this example is two, it should not be limited in the disclosure.

In one embodiment, a writing liquid configured in the writing brush used by the user is an infrared penetrating dye 740 mixed with glass beads, and the light can achieve a retro-reflector effect, so that the camera 716 may still capture the handwriting trajectory during writing.

The computing device 720 is the same as the computing device 120 in FIG. 1, so the details related to the computing device 720 will be omitted.

Figure 8:
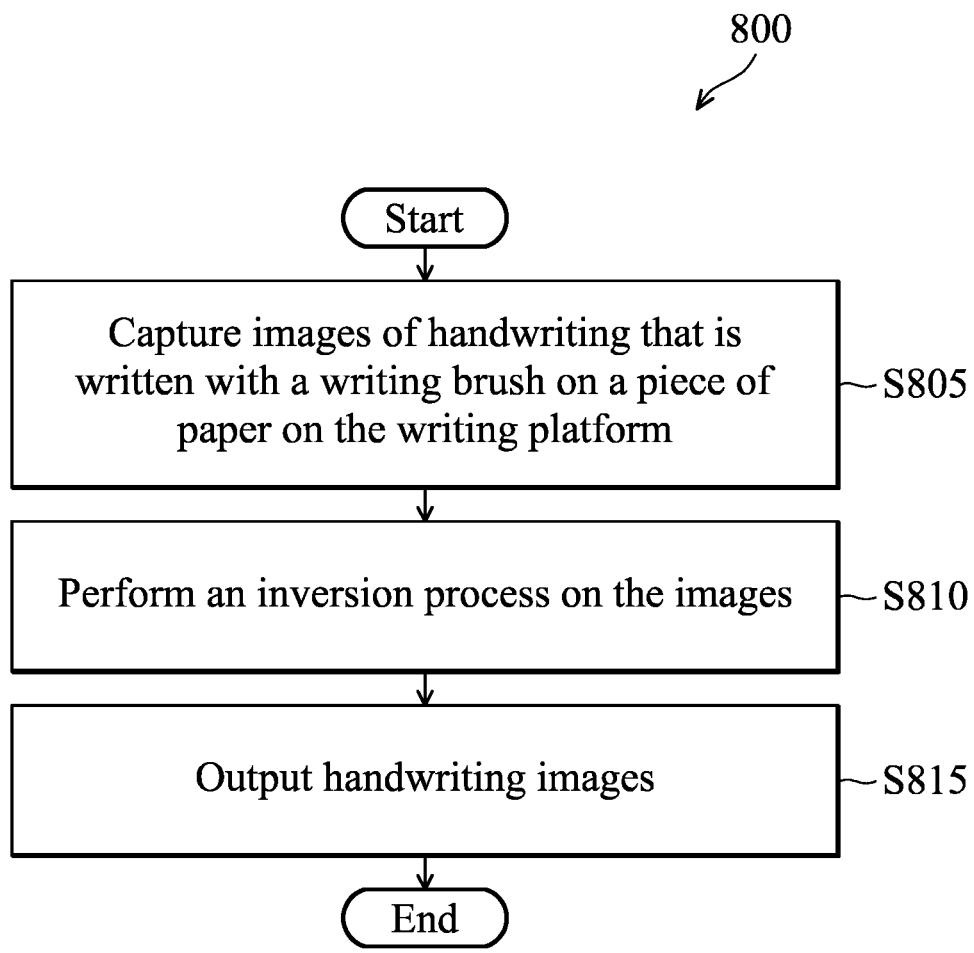
FIG. 8 is a flowchart illustrating a method for obtaining a handwriting trajectory according to an embodiment of the present disclosure.

FIG. 8 is a flowchart 800 illustrating a method for obtaining a handwriting trajectory according to an embodiment of the present disclosure. The method may be executed by the writing platform 710 and the computing device 720 of the system 700 as shown in FIG. 7.

In step S805, the camera of the writing platform captures images of handwriting that is written with a writing brush on a piece of paper on the writing platform. Next, in step S810, the computing device performs an inversion process on the images. Specifically, since the special glass and writing fluid are used in this embodiment, the obtained images may have to be reversed to obtain the handwriting trajectory. The inversion process in step S810 converts each grayscale value in each of the images into a value of 255 minus the grayscale value (i.e., the grayscale value=255−the original grayscale value). As an example, it is assumed that the grayscale value of a pixel is 255, the grayscale value after the inversion process is 0 (0=255−255). In step S815, the computing device outputs handwriting trajectory images.

Therefore, a method and system for obtaining a handwriting trajectory provided in the disclosed embodiments adopt architecture composed of ambient light and a reflective light source, and integrates the advantages of light and dark information of light-emitting diode to perform image processing, so as to achieve the purpose of obtaining a clear handwriting trajectory.

Figure 9:
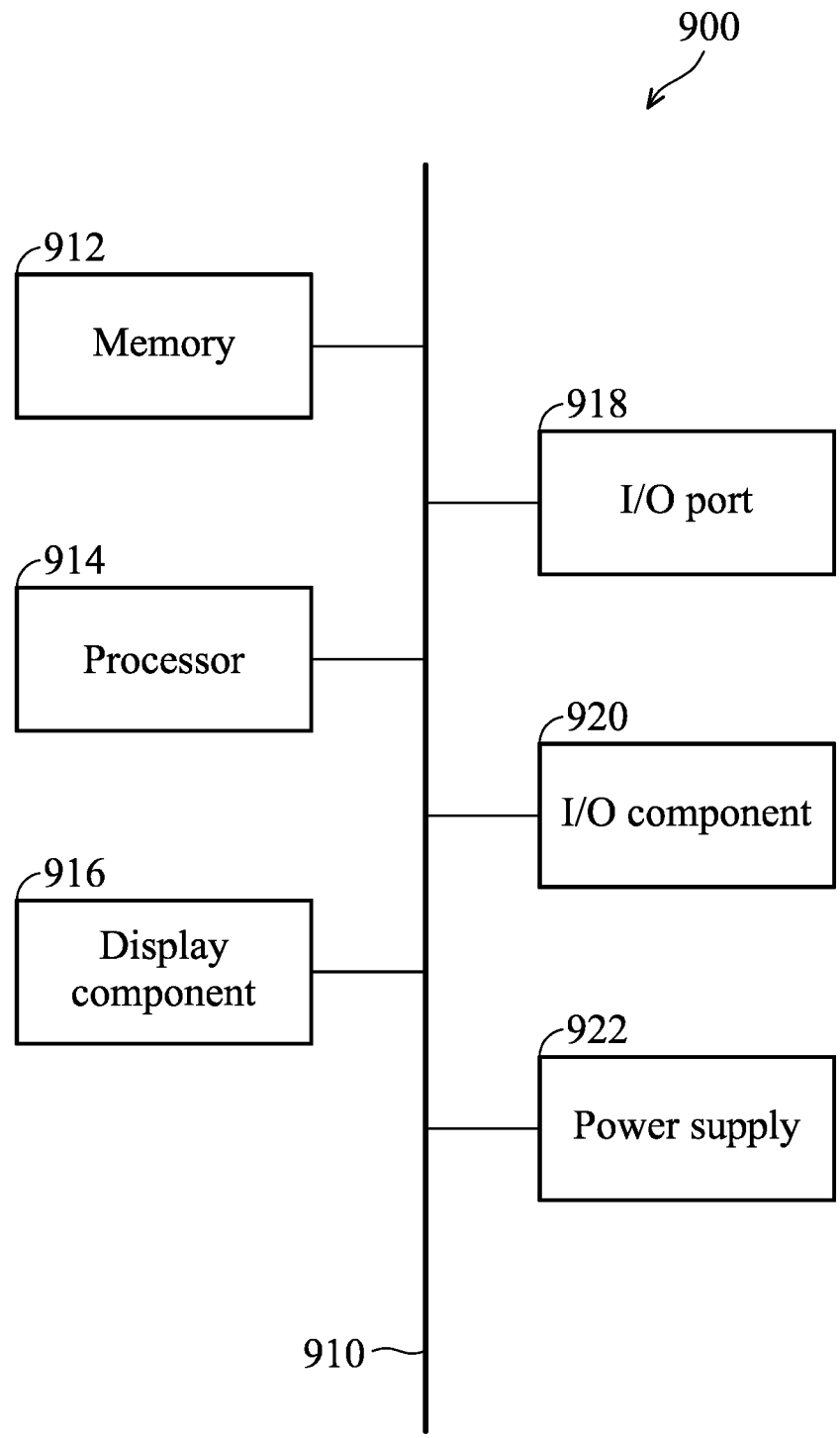
FIG. 9 illustrates an exemplary operating environment for implementing embodiments of the present disclosure.

Having described embodiments of the present disclosure, an exemplary operating environment in which embodiments of the present disclosure may be implemented is described below. Referring to FIG. 9, an exemplary operating environment for implementing embodiments of the present disclosure is shown and generally known as a computing device 900. The computing device 900 is merely an example of a suitable computing environment and is not intended to limit the scope of use or functionality of the disclosure. Neither should the computing device 900 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 9, the computing device 900 may include a bus 910 that is directly or indirectly coupled to the following devices: one or more memories 912, one or more processors 914, one or more display components 916, one or more input/output (I/O) ports 918, one or more input/output components 920, and an illustrative power supply 922. The bus 910 may represent one or more kinds of busses (such as an address bus, data bus, or any combination thereof). Although the various blocks of FIG. 9 are shown with lines for the sake of clarity, and in reality, the boundaries of the various components are not specific. For example, the display component such as a display device may be considered an I/O component and the processor may include a memory.

The computing device 900 typically includes a variety of computer-readable media. The computer-readable media can be any available media that can be accessed by computing device 900 and includes both volatile and nonvolatile media, removable and non-removable media. By way of example, not limitation, computer-readable media may comprise computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 900. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 912 may include computer-storage media in the form of volatile and/or nonvolatile memory. The memory may be removable, non-removable, or a combination thereof. Exemplary hardware devices include solid-state memory, hard drives, optical-disc drives, etc. The computing device 900 includes one or more processors that read data from various entities such as the memory 912 or the I/O components 920. The display component(s) 916 present data indications to a user or to another device. Exemplary presentation components include a display device, speaker, printing component, vibrating component, etc.

The I/O ports 918 allow the computing device 900 to be logically coupled to other devices including the I/O components 920, some of which may be embedded. Illustrative components include a microphone, joystick, game pad, satellite dish, scanner, printer, wireless device, etc. The I/O components 920 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 900, or any combination thereof. The computing device 900 may be equipped with depth cameras, such as stereoscopic camera systems, infrared camera systems, RGB camera systems, or any combination thereof, to realize gesture detection and recognition. Furthermore, the computing device 900 may be equipped with accelerometers or gyroscopes that enable detection of motion. The output of the accelerometers or gyroscopes may be provided to the display of the computing device 900 to carry out immersive augmented reality or virtual reality.

Furthermore, the processor 914 in the computing device 900 can execute the program code in the memory 912 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for obtaining a handwriting trajectory, comprising:

capturing, by a camera, images of handwriting that is written with a writing brush on a piece of paper on a writing platform;

obtaining, by a computing device, positions where pixels in each of the images are lower than a threshold according to the threshold; and outputting, by the computing device, handwriting images according to the positions, wherein the writing platform comprises:

a box, wherein an upper plane of the box is a glass on which the paper is placed;

at least one light source, disposed inside the box and illuminating the glass; and the camera, disposed inside the box and below the glass, and capturing the images.

2. The method for obtaining a handwriting trajectory as claimed in claim 1, wherein the camera captures the images periodically, and the at least one light source illuminates the glass in a flickering manner; and wherein the at least one light source is a visible light-emitting diode (LED).

3. The method for obtaining a handwriting trajectory as claimed in claim 2, wherein before capturing the images, the method further comprises:

obtaining an initial background image when the at least one light source is turned on; and defining the threshold according to a grayscale value of the initial background image.

4. A method for obtaining a handwriting trajectory, comprising:

capturing, by a camera, images of handwriting that is written with a writing brush on a piece of paper on a writing platform;

performing, by a computing device, an inversion process on the images; and outputting, by the computing device, handwriting images, wherein the writing platform comprises:

a box, wherein an upper plane of the box is a black infrared (IR) glass on which the paper is placed;

the camera, disposed inside the box and below the black infrared glass, and capturing the images; and at least one infrared light-emitting diode (LED), arranged around the camera to illuminate the glass.

5. The method for obtaining a handwriting trajectory as claimed in claim 4, wherein a writing liquid configured in the writing brush is infrared penetrating dye mixed with glass beads; and wherein the inversion process comprises:

converting each grayscale value in each of the images to a value of 255 minus the grayscale value.

6. A system for obtaining a handwriting trajectory, comprising:

a computing device; and a writing platform, coupled to the computing device, comprising:

a box, wherein an upper plane of the box is a glass on which a piece of paper is placed;

at least one light source, disposed inside the box and illuminating the glass; and a camera, disposed inside the box and below the glass;

wherein the computing device and the writing platform execute the following operations:

capturing images of handwriting that is written with a writing brush on the paper by the camera;

obtaining positions where pixels in each of the images are lower than a threshold according to the threshold; and outputting handwriting images according to the positions.

7. The system for obtaining a handwriting trajectory as claimed in claim 6, wherein the system further executes:

obtaining an initial background image when the at least one light source is turned on; and defining, by the computing device, the threshold according to a grayscale value of the initial background image.

8. The system for obtaining a handwriting trajectory as claimed in claim 6, wherein the camera captures the images periodically, and the at least one light source illuminates the glass in a flickering manner; and wherein the at least one light source is a visible light-emitting diode (LED).

* * * * *